United States Patent Office 3,169,978
Patented Feb. 16, 1965

3,169,978
12α-METHYL PREGNENE DERIVATIVES
Patrick A. Diassi, Westfield, Pacifico A. Principe, South River, and Josef Fried, Princeton, N.J., assignors to Olin Mathieson Chemical Corporation, New York, N.Y., a corporation of Virginia
No Drawing. Original application May 31, 1963, Ser. No. 284,313. Divided and this application Mar. 5, 1964, Ser. No. 354,495
3 Claims. (Cl. 260—397.3)

This application is a division of application Serial No. 284,313, filed May 31, 1963.

This invention relates to a new process for the production of steroids and to new intermediates produced in the process.

Steroids of the formula (I)

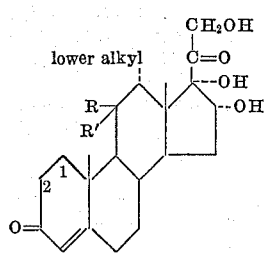

wherein R and R' represent an 11β-hydroxy or 11-keto structure and the 1,2-position is saturated or double bonded, as well as the 16 and/or 21 esters thereof, are physiologically active substances which possess glucocorticoid, antiinflammatory and progestational activity and which are also useful in the production of the 16,17-acetal and ketal derivatives disclosed in U.S. Patent No. 3,048,581. This invention relates to a new process for producing such compounds.

According to the process of this invention, the starting materials are 12α-lower alkyl-11β-hydroxyprogesterone, 12α-lower alkyl-11β-ketoprogesterone or the corresponding 1-dehydroprogesterones. These starting materials are subjected to the enzymes of *Streptomyces roseochromogenus* in an aqueous medium containing a source of nitrogenous factors and an assimilable source of carbon and energy, in the presence of oxygen, and the 16α-hydroxy steroid of the formula (II)

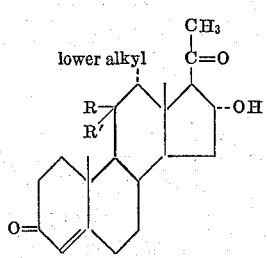

thus formed is recovered.

The compound of Formula II is then subjected to the action of an aluminum alkoxide to form a new intermediate of the formula (III)

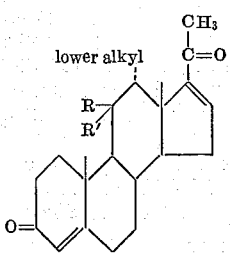

The preferred conditions include an aluminum lower alkoxide, especially aluminum t-butoxide, an elevated temperature somewhat in excess of room temperature up to about reflux temperature, an organic solvent, especially an aromatic hydrocarbon of the benzene series such as toluene or xylene, and an inert atmosphere especially nitrogen.

Next, the compound of Formula III is subjected to the action of the enzymes of the microorganism *Wojnowicia graminis*, *Ophiobolus herpotrichus* or *Aspergillus niger* in an aqueous medium containing a source of carbon and energy, in the presence of oxygen, and is thereby converted to a new compound of the formula (IV)

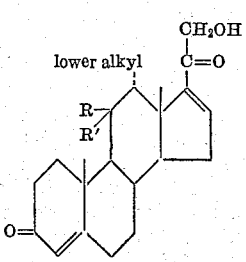

The hydroxy group in the 21-position is then acylated, preferably with a lower alkanoic acid or anhydride such as acetic acid or anhydride and in the presence of an organic base such as pyridine. The 21-ester of Formula IV thus formed is then oxidized with osmium tetroxide, preferably in an organic hydrocarbon solvent of the benzene series in the presence of an organic base such as pyridine at about room temperature to obtain a compound of the formula (V)

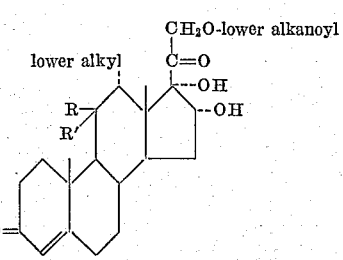

The 21-ester group may be hydrolyzed to the 21-hydroxy group with a salt of a strong base and weak acid such as potassium carbonate thereby obtaining a compound of Formula I.

In each of Formulas II to V, R and R' have the same meaning as in Formula I and the 1,2-position may be saturated or double bonded. 12α-methyl compounds are preferred throughout.

The following examples are illustrative of the invention with all temperatures being expressed on the centigrade scale. A method for the preparation of the starting materials is included in the examples. In each instance, a 12α-lower alkyl compound other than the 12α-methyl compound illustrated may be utilized if a lithium alkyl other than lithium methyl, e.g., lithium ethyl, is used in the preparation of the 12α-alkylprogresterone used as starting material.

EXAMPLE I (a) *Preparation of 9α-fluoro-11-ketoprogesterone 3,20-bis-ethylene ketal*

A mixture of 10 g. of 9α-fluoro-11-ketoprogesterone, 350 ml. of benzene, 80 ml. of ethylene glycol and 200 mg. of paratoluenesulfonic acid monohydrate is refluxed with stirring for 72 hours. The reaction mixture is then cooled to room temperature and neutralized with sodium bicarbonate solution. The phases are separated and the aqueous layer reextracted with additional amounts of benzene. The combined benzene extracts are washed with water, dried over sodium sulfate and evaporated to dryness in vacuo. The crude residue on crystallization from acetone-hexane yields about 11 g. of the essentially pure bis-ethylene ketal melting at about 179–182°. Recrystallization of this material from methanol gives an analytical sample of the following properties: M.P. about 189–190°; $[\alpha]_D^{23}$ −25°.

Analysis.—Calcd. for $C_{25}H_{34}O_5F$ (434.53): C, 69.10; H, 8.12. Found: C, 69.19; H, 8.18.

(b) *Preparation of 12α-methyl-11-ketoprogesterone 3,20-bis-ethylene ketal*

A solution of 9α-fluoro-11-ketoprogesterone 3,20-bis-ethylene ketal (10 g.) in benzene (100 ml.) is treated with an ethereal solution of lithium methyl (150 ml., 13.5 mg. of lithium metal/ml.). The solution is stirred for 4 hours at room temperature and then the excess lithium methyl is decomposed by the addition of ice. Chloroform (300 ml.) is added, and the mixture is washed several times with water, dried over sodium sulfate and evaporated in vacuo. Trituration of the residue with hexane gives about 4.2 g. of 12α-methyl-11-ketoprogesterone 3,20-bis-ethylene ketal, M.P. about 135–138°. A second crop of crystals (about 2.4 g., M.P. about 124-130°) is obtained on concentrating the hexane mother liquor. Crystallization from methanol gives an analytical sample melting at about 139–142°, $[\alpha]_D$ −8.8° (c. 0.716 in $CHCl_3$)

$\lambda_{Max.}^{Nujol}$ 5.87μ

Analysis.—Calcd. for $C_{26}H_{38}O_5$ (430.56): C, 72.50; H, 8.90. Found: C, 72.71; H, 8.90.

(c) *Preparation of 12α-methyl-11β-hydroxyprogesterone 3,20-bis-ethylene ketal*

A solution of 1 g. of 12α-methyl-11-ketoprogesterone 3,20-bis-ethylene ketal in 50 ml. of dry tetrahydrofuran is heated under reflux with 1 g. of lithium aluminum hydride for 18 hours. Ice is added to the cooled solution to decompose excess reagent and then a saturated aqueous solution of sodium sulfate is added with stirring until the precipitated aluminum salts are formed in a slurry. The clear ether solution is decanted off and the organic material is washed twice with chloroform. The combined organic extracts are dried over sodium sulfate and then evaporated in vacuo. The residue is dissolved in 10 ml. benzene and absorbed on a column of 30 g. of alumina. Elution with benzene (900 ml.) and chloroform-benzene (1:9, 500 ml.), followed by crystallization from acetone-hexane, yields 12α-methyl-11β-hydroxyprogesterone 3,20-bis-ethylene ketal (about 660 mg.) melting at about 169–175°. Crystallization from acetone-hexane affords an analytical sample which melts at about 177–179°; $[\alpha]_D$ −11.5° (c. 1.24 in $CHCl_3$)

$\lambda_{Max.}^{Nujol}$ 2.8μ

Analysis.—Calcd. for $C_{26}H_{40}O_5$ (432.58): C, 72.19; H, 9.32. Found: C, 72.30; H, 9.20.

(d) *Preparation of 12α-methyl-11β-hydroxyprogesterone*

A solution of 1.4 g. of 12α-methyl-11β-hydroxyprogesterone 3,20-bis-ethylene ketal in 30 ml. of methanol and 3 ml. of 8% sulfuric acid is heated under reflux for one hour. The mixture is diluted with water, the precipitated solid collected and crystallized from chloroform-methanol to give about 1.1 g. of 12α-methyl-11β-hydroxyprogesterone, M.P. about 235–238°. Crystallization from chloroform-methanol gives an analytical sample melting at about 238–240°, $[\alpha]_D$ +199° (c. 1.08 in $CHCl_3$)

$\lambda_{Max.}^{EtOH}$ 241 mμ (16,600); $\lambda_{Max.}^{Nujol}$ 2.9, 5.91 (inflection); 5.95, 6.14

Analysis.—Calcd. for $C_{22}H_{32}O_3$ (344.48): C, 76.70; H, 9.32. Found: C, 76.59; H, 9.41.

(e) *Preparation of 12α-methyl-11β, 16α-dihydroxy-progesterone*

A *Streptomyces roseochromogenus* (Waksman No. 3689, The Institute of Microbiology, Rutgers University, New Brunswick, New Jersey) culture is maintained on Gould agar (agar, 20 g.; glucose, 10 g.; yeast extract, 2.5 g.; $K_2HPO_4$, 1 g.; distilled water to 1 liter). Inoculum for the first flask stage is prepared by suspending the surface growth from each of 2 two week old agar slant culture with 5 ml. of an 0.01% Duponol (Merck Index, 7th ed., 1960) solution. One milliliter portions of inoculum are used to inoculate ten 250 ml. Erlermeyer flasks, each containing 50 ml. of the following medium (A):

| | Grams |
|---|---|
| Soybean meal | 20 |
| Glucose | 30 |
| Soybean oil | 2.2 |
| Calcium carbonate | 2.5 |
| Distilled water to 1 liter. | |

The flasks are then incubated at 25° C. on a rotary shaker (280 cycles/minute, 2 inch radius) for 72 hours. After 72 hours, a 10% transfer (by volume) to made to each of 45 250 ml. Erlenmeyer flasks, each containing 50 ml. of the same medium A. At the time of inoculation of these flasks, 25 mg. of steroid is added to each flask using 0.25 ml. per flask of a 100 mg./ml. solution of 12α-methyl-11β-hydroxyprogesterone in N,N-dimethylformamide. A total of 1.125 g. of steroid is thereby fermented. After inoculation and supplementation the flasks are then incubated under the same conditions as described above. At approximately 120 hours after steroid addition, the culture broths are harvested. The contents from each flask are pooled and the pooled broth is then adjusted to pH 4.5 using 12 N $H_2SO_4$. The acidified broth is then filtered through a Buchner-Seitz clarifying pad apparatus. The filtrate (3000 ml.) is collected and extracted three times with one liter portions of chloroform. The combined chloroform extracts are washed twice with 1.5 l. of water and then evaporated to dryness in vacuo. Crystallization of the residue from acetone-hexane gives about 825 mg. of 12α-methyl-11β,16α-dihydroxyprogesterone having a melting point about 208–209°, $[\alpha]_D^{22}$ +164° (chloroform)

$\lambda_{max.}^{alc.}$ 242 mμ (ε=15,800)

Analysis.—Calcd. for $C_{22}H_{32}O_4$ (360.48): C, 73.30; H, 8.95. Found: C, 73.32; H, 8.91.

(f) *Preparation of 12α-methyl-$\Delta^{4,16}$-pregnadiene-11β-ol-3,20-dione*

A suspension of 640 mg. of 12α-methyl-11β,16α-dihydroxyprogesterone and 1.5 g. of aluminum tert-butoxide in 180 ml. of dry toluene is refluxed under nitrogen for two hours. The mixture is then cooled and washed successively with 2 N hydrochloric acid, water, 5% sodium bicarbonate and water and then evaporated to dryness in vacuo. The residue is crystallized from acetone-hexane to yield 475 mg. of 12α-methyl-Δ$^{4,16}$-pregnadiene-11β-ol-3,20-dione having a melting point about 224–226°, $[\alpha]_D^{22}$ +258° (chloroform)

$\lambda_{max.}^{alc.}$ 244 mμ (ε=26,000)

*Analysis.*—Calcd. for $C_{22}H_{30}O_3$ (342.46): C, 77.15; H, 8.83. Found: C, 77.11; H, 8.73.

(g) *Preparation of 12α-methyl-16-dehydrocorticosterone 21-acetate*

A *Wojnowicia graminis* culture (Centraal Bureau voor Schimmel Cultures, Baarn, The Netherlands) is maintained on Gould agar (agar, 20 g.; glucose, 10 g.; yeast extract, 2.5 g.; K$_2$HPO$_4$, 1 g.; distilled water to 1 liter). Inoculum for the first flask stage is prepared by suspending the surface growth from each of 2 two week old gear slant cultures with 5 ml. of an 0.01% Duponol (Merck Index, 7th ed., 1960) solution. One milliliter portions of inoculum are used to inoculate ten 250 ml. Erlenmeyer flasks, each containing 50 ml. of medium (A): Soybean meal, 20 g.; glucose, 30 g.; soybean oil, 2.2 g.; calcium carbonate, 2.5 g.; distilled water to 1 liter. The flasks are then incubated at 25° C. on a rotary shaker (280 cycles per minute, 2 inch radius) for 96 hours. After 96 hours, a 10% transfer (by volume) is made to each of 50 250 ml. Erlenmeyer flasks, each containing 50 ml. of the following sterilized nutrient medium (B): dextrose, 10 g.; cornsteep liquor, 6 g.; NH$_4$H$_2$PO$_4$, 3 g.; Difco yeast extract, 2.5 g.; CaCO$_3$, 2.5 g.; and distilled water to 1 liter. At the time of inoculation of these flasks, 5 mg. of steroid is added to each flask using 0.25 ml. per flask of a 20 mg./ml. solution of 12α-methyl-Δ$^{4,16}$-pregnadiene-11β-ol-3,20-dione in N,N-dimethyl formamide. A total of 250 mgs. of steroid is thereby fermented. After inoculation and supplemention of the flasks with steroid, the flasks are then incubated under the same conditions as described above.

After 96 hours of further incubation, the contents of the flasks are pooled and filtered through a Seitz clarifying pad. The flasks, mycelium and pad are washed with successive 50 ml. portions of warm water. The combined filtrate and washings have a volume of 2800 ml. This is extracted with three 3.3 l. portions of chloroform which are combined, washed twice with 5.0 l. portions of water and evaporated to dryness in vacuo. The residue is dissolved in a mixture of 12 ml. of dry pyridine and 4 ml. of acetic anhydride and left at room temperature for four hours. Upon addition of ice water, crystals of 12α-methyl-16-dehydrocorticosterone 21 - acetate separate which are filtered, washed with water and dried. This compound has a melting point about 190–192° C., $[\alpha]_D^{22}$ +197° (chloroform)

$\lambda_{max.}^{alc.}$ 242 mμ (ε=22,000)

*Analysis.*—Calcd. for $C_{24}H_{32}O_5$ (400.50): C, 71.97; H, 8.05. Found: C, 71.77; H, 8.14.

By substituting either a culture of *Ophiobolus herpetrichus* (Centraal Bureau voor Schimmel Cultures, Baarn, The Netherlands) or a culture of *Aspergillus niger* (ATCC 9142) for the culture of *Wojnowicia graminis* in the above procedure and otherwise following the same technique, 12α-methyl-16-dehydrocorticosterone is similarly obtained.

(h) *Preparation of 12α-methyl-16α-hydroxyhydrocortisone 21-acetate*

To a stirred solution of 25.4 mg. of 12α-methyl-16-dehydrocorticosterone 21-acetate in 4 ml. of benzene containing 0.2 ml. of pyridine a solution of 16.7 mg. (0.066 mmol.) of osmium tetroxide in 0.82 ml. of benzene is added dropwise over a ten minute period. The solution is stirred at room temperature and after 45 minutes a precipitate separates. The stirring is continued for 2½ hours and then 4 ml. of an aqueous solution containing .36 g. each of sodium sulfite and potassium bicarbonate which is free of oxygen is added followed by 2 ml. of methanol. The mixture is then stirred under nitrogen for 3 hours, filtered and washed thoroughly with chloroform and warm tetrahydrofuran. The filtrate is washed with water and evaporated to dryness in vacuo. Crystallization of the residue from acetone-hexane gives 10 mg. of 12α-methyl-16α-hydroxycortisone 21-acetate having a melting point about 194–196° C.

(i) *Preparation of 12α-methyl-16α-hydroxyhydrocortisone*

To a stirred solution of 50 mg. of 12α-methyl-16α-hydroxyhydrocortisone 21-acetate in 10 ml. of methanol (oxygen free) is added 1 ml. of 10% K$_2$CO$_3$ (oxygen free) and the mixture stirred at room temperature under nitrogen for two hours. This solution is then neutralized with 1 ml. of 10% acetic acid and diluted with water whereupon crystals separate. They are filtered, washed with water and dried to give 35 mg. of 12α-methyl-16α-hydroxyhydrocortisone.

EXAMPLE 2

(a) *Preparation of 12α-methyl-11-ketoprogesterone*

A solution of 300 mg. of 12α-methyl-11-ketoprogesterone 3,20-bis-ethylene ketal in 10 ml. methanol and 1 ml. of 8% sulfuric acid is heated under reflux for 4 hours. The mixture is then diluted with water, the precipitated solid (about 210 mg., M.P. about 154–156°) collected and crystallized from acetone-hexane. The resulting sample of 12α-methyl-11-ketoprogesterone melts at about 155–157°; $[\alpha]_D$ +227° (c. 1.36 in CHCl$_3$)

$\lambda_{Max.}^{EtOH}$ 236 mμ (15,800); $\lambda_{Max.}^{Nujol}$ 5.88, 5.96, 6.18μ

*Analysis.*—Calcd. for $C_{21}H_{30}O_3$ (342.46): C, 77.15; H, 8.83. Found: C, 76.60; H, 8.76.

Similarly, by substituting 12α-ethyl-11-ketoprogesterone-3,20-bis-ethylene ketal for the 12α-methyl steroid in the above procedure, 12α-ethyl-11-ketoprogesterone is obtained. Furthermore, any other bis ketal derivatives can be similarly hydrolyzed to yield the same free 3,11,20-triketone derivatives.

(b) By substituting 12α-methyl-11-ketoprogesterone for 12α-methyl-11β-hydroxyprogesterone in Example 1(e) and following the same procedure described in parts (e) through (i) of that example, there are obtained successively 12α-methyl-16α-hydroxy-11-ketoprogesterone, 12α-methyl-Δ$^{4,16}$-pregnadiene-3,11,20-trione, 12α-methyl-Δ$^{4,16}$-pregnadiene-21-ol-3,11,20-trione, 12α-methyl-Δ$^{4,16}$-pregnadiene-21-ol-3,11,20-trione 21-acetate, 12α-methyl-16α-hydroxycortisone 21-acetate and 12α-methyl-16α-hydroxycortisone.

EXAMPLE 3

(a) *Preparation of 12α-methyl-Δ$^{1,4}$-pregnadiene-3,11,20-trione*

To a solution of 100 mg. of 12α-methyl-11-ketoprogesterone in 10 ml. of dioxane is added 60 g. of 2,3-dichloro-5,6-dicyanobenzoquinone and the mixture refluxed under nitrogen for 6 hours. After cooling, the precipitated 2,3-dichloro-5,6-dicyanohydroquinone is filtered and washed with dioxane. The filtrate is diluted with an equal volume of chloroform and poured onto a column of 10 g. of Woelm neutral alumina. Elution with chloroform followed by evaporation of the solvent and crystallization of the residue gives 12α-methyl-Δ$^{1,4}$-pregnadiene-3,11,20-trione.

(b) *Preparation of 12α-methyl-16α-hydroxyprednisone*

By substituting the product of part (a) above in Example 1(c) and following the same procedure described in parts (e) through (i) of that example there are obtained successively 12α-methyl-Δ¹,⁴-pregnadiene-16α-ol-3,11,20-trione, 12α-methyl-Δ¹,⁴,¹⁶-pregnatriene-3,11,20-trione, 12α-methyl-Δ¹,⁴,¹⁶-pregnatriene-3,11,20-trione, 12α-methyl-Δ¹,⁴,¹⁶-pregnatriene-21-ol-3,11,20-trione 21-acetate, 12α-methyl-16α-hydroxyprednisone 21-acetate and 12α-methyl-16α-hydroxyprednisone.

EXAMPLE 4

*Preparation of 12α-methyl-Δ¹,⁴-pregnadiene-11β-ol-3,20-dione*

By following the procedure of Example 3 in its entirety, but substituting 12α-methyl-11β-hydroxyprogesterone as the starting material the 1-dehydro analogs of each of the compounds in that example are obtained successively with 12α-methyl-16α-hydroxyprednisolone as the final product.

What is claimed is:
1. 12α-methyl-Δ¹,⁴-pregnadiene-11β,16α-diol-3,20-dione.
2. 12α-methyl-Δ¹,⁴,¹⁶-pregnatriene-3,11,20-trione.
3. 12α-methyl-Δ¹,⁴,¹⁶-pregnatriene-11β-ol-3,20-dione.

References Cited by the Examiner
UNITED STATES PATENTS

| | | | |
|---|---|---|---|
| 3,014,905 | 12/61 | Yang et al. | 260—239.55 |
| 3,048,581 | 8/62 | Fried | 260—239.55 |
| 3,056,730 | 10/62 | Laskin | 195—51 |
| 3,080,388 | 3/63 | Thomas et al. | 260—317.3 |

OTHER REFERENCES

Nagarajan et al.: "Can. J. Chem." vol. 39 (1961), pages 1274–1278.

LEWIS GOTTS, *Primary Examiner.*